(12) United States Patent
Chen et al.

(10) Patent No.: US 9,996,304 B2
(45) Date of Patent: Jun. 12, 2018

(54) DATA STORAGE DEVICE AND DATA MAINTENANCE METHOD THEREOF

(71) Applicant: Silicon Motion, Inc., Jhubei, Hsinchu County (TW)

(72) Inventors: Kuan-Lin Chen, Taichung (TW); Wu-Chi Kuo, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 164 days.

(21) Appl. No.: 15/059,240

(22) Filed: Mar. 2, 2016

(65) Prior Publication Data

US 2016/0259552 A1 Sep. 8, 2016

Related U.S. Application Data

(60) Provisional application No. 62/127,896, filed on Mar. 4, 2015.

(30) Foreign Application Priority Data

Sep. 15, 2015 (TW) .............................. 104130401 A (51) Int. Cl.
*G06F 3/06* (2006.01)
*G06F 12/08* (2016.01)
(52) U.S. Cl.
CPC ............ *G06F 3/0688* (2013.01); *G06F 3/064* (2013.01); *G06F 3/0616* (2013.01); *G06F 12/08* (2013.01)
(58) Field of Classification Search
CPC ...................................................... G06F 3/06
See application file for complete search history.

(56) References Cited

U.S. PATENT DOCUMENTS

| 8,645,978 | B2 | 2/2014 | Bembo et al. |
| 8,677,203 | B1* | 3/2014 | Shalvi ..................... G06F 11/14 714/723 |
| 8,902,671 | B2 | 12/2014 | Ko et al. |
| 8,954,653 | B1* | 2/2015 | Lo ....................... G06F 12/0246 711/103 |
| 9,176,817 | B2 | 11/2015 | Cideciyan et al. |
| 2009/0193174 | A1* | 7/2009 | Reid ................... G06F 12/0246 711/100 |

(Continued)

FOREIGN PATENT DOCUMENTS

TW 201131359 9/2011
TW 201421477 6/2014

*Primary Examiner* — Tracy Chan
(74) *Attorney, Agent, or Firm* — McClure, Qualey & Rodack, LLP (57) ABSTRACT

The present invention provides a data storage device including a flash memory, a plurality of counting control arrays and a controller. The flash memory includes a plurality of chips, each chip has a plurality of pages arranged to be assembled into a super block according to a predetermined order, and each of the super blocks includes the pages of the different chips. The controller keeps the value of a first field of a first counting control array corresponding to a first chip required to be read and writes a second value into the other fields except for the first field of the first counting control array when the first field is a first value, and writes the first value into the first field and keeps the values of the other fields of the first counting control array when the first field is the second value.

19 Claims, 8 Drawing Sheets

(56) References Cited

U.S. PATENT DOCUMENTS

2013/0132652 A1* 5/2013 Wood ............... G06F 12/0246
  711/103
2014/0258665 A1 9/2014 Nakamura et al.

* cited by examiner

| SB1 | | | | | | |
|---|---|---|---|---|---|---|
| C0_P0 | C1_P0 | C2_P0 | ... | C14_P0 | C15_P0 | ─ SP0 |
| C0_P1 | C1_P1 | C2_P1 | ... | C14_P1 | C15_P1 | ─ SP1 |
| C0_P2 | C1_P2 | C2_P2 | ... | C14_P2 | C15_P2 | ─ SP2 |
| | | | ⋮ | | | ⋮ |
| C0_PK-1 | C1_PK-1 | C2_PK-1 | ... | C14_PK-1 | C15_PK-1 | ─ SPK-1 |

| SB2 | | | | | | |
|---|---|---|---|---|---|---|
| C0_PK | C1_PK | C2_PK | ... | C14_PK | C15_PK | ─ SP0 |
| C0_PK+1 | C1_PK+1 | C2_PK+1 | ... | C14_PK+1 | C15_PK+1 | ─ SP1 |
| C0_PK+2 | C1_PK+2 | C2_PK+2 | ... | C14_PK+2 | C15_PK+2 | ─ SP2 |
| | | | ⋮ | | | ⋮ |
| C0_PM | C1_PM | C2_PM | ... | C14_PM | C15_PM | ─ SPK-1 |

| | RCA1 (T1) | RCA1 (T2) | RCA1 (T3) | ... | RCA1 (T17) | RCA1 (T18) |
|---|---|---|---|---|---|---|
| CE0_CH0 | 1 | 1 | 1 | | 1 | 1 |
| CE0_CH1 | 1 | 0 | 1 | | 1 | 0 |
| CE0_CH2 | 1 | 0 | 0 | | 1 | 0 |
| CE0_CH3 | 1 | 0 | 0 | | 1 | 0 |
| CE1_CH0 | 1 | 0 | 0 | | 1 | 0 |
| CE1_CH1 | 1 | 0 | 0 | | 1 | 0 |
| CE1_CH2 | 1 | 0 | 0 | | 1 | 0 |
| CE1_CH3 | 1 | 0 | 0 | | 1 | 0 |
| CE2_CH0 | 1 | 0 | 0 | | 1 | 0 |
| CE2_CH1 | 1 | 0 | 0 | | 1 | 0 |
| CE2_CH2 | 1 | 0 | 0 | | 1 | 0 |
| CE2_CH3 | 1 | 0 | 0 | | 1 | 0 |
| CE3_CH0 | 1 | 0 | 0 | | 1 | 0 |
| CE3_CH1 | 1 | 0 | 0 | | 1 | 0 |
| CE3_CH2 | 1 | 0 | 0 | | 1 | 0 |
| CE3_CH3 | 1 | 0 | 0 | | 1 | 0 |

| | CE0_CH0 | CE0_CH1 | CE0_CH2 | CE0_CH3 | CE1_CH0 | CE1_CH1 | CE1_CH2 | CE1_CH3 | CE2_CH0 | CE2_CH1 | CE2_CH2 | CE2_CH3 | CE3_CH0 | CE3_CH1 | CE3_CH2 | CE3_CH3 |
|---|---|---|---|---|---|---|---|---|---|---|---|---|---|---|---|---|
| RCA(T1) | 1 | 1 | 1 | 1 | 1 | 1 | 1 | 1 | 1 | 1 | 1 | 1 | 1 | 1 | 1 | 1 |
| RCA(T2) | 0 | 0 | 1 | 0 | 0 | 0 | 0 | 0 | 0 | 0 | 0 | 0 | 0 | 0 | 0 | 0 |
| RCA(T3) | 0 | 0 | 1 | 0 | 0 | 0 | 0 | 0 | 0 | 0 | 0 | 0 | 0 | 0 | 1 | 0 |
| RCA(T4) | 0 | 0 | 0 | 0 | 0 | 0 | 0 | 0 | 0 | 0 | 0 | 0 | 0 | 0 | 1 | 0 |

DATA STORAGE DEVICE AND DATA MAINTENANCE METHOD THEREOF

CROSS REFERENCE TO RELATED APPLICATIONS

This application claims the benefit of U.S. Provisional Application No. 62/127,896 filed Mar. 4, 2015, the entirety of which is incorporated by reference herein. Furthermore, this Application claims priority of Taiwan Patent Application No. 104130401, filed on Sep. 15, 2015, the entirety of which is incorporated by reference herein.

BACKGROUND OF THE INVENTION

Field of the Invention

The present invention relates to a data maintenance method of a memory device, and in particular to a data maintenance method compatible of recording read counts of super blocks.

Description of the Related Art

Flash memory is considered a non-volatile data storage device, using electrical methods to erase and program itself. Taking NAND Flash as an example, it is often used in memory cards, USB flash devices, solid state devices, eMMC, and in other uses.

Flash memory such as NAND Flash uses a multiple-block structure to store data. Each block contains multiple pages, wherein the write unit of the flash memory is the page, and the erase unit of the flash memory is the block. The stored data may be damaged due to repeatedly reading the same page or the same block. Therefore, a data maintenance method which can avoid reading the same page or the same block too many times is needed.

BRIEF SUMMARY OF THE INVENTION

A detailed description is given in the following embodiments with reference to the accompanying drawings.

An exemplary embodiment provides a data storage device including a flash memory, a plurality of counting control arrays and a controller. The flash memory includes a plurality of chips, a plurality of channel select lines and a plurality of chip select lines, wherein each chip has a plurality of pages, and the chips are arranged in a matrix, the channel select lines are arranged to select columns of the matrix, the chip select lines are arranged to select rows of the matrix, the pages of each of the chips are arranged to be assembled into a super block according to a predetermined order, and each of the super blocks includes the pages of the different chips. Each of the counting control arrays includes a plurality of fields, the counting control arrays corresponds to one of the super blocks, and each of the fields corresponds to one of a plurality of combinations of the chip select lines and the channel select lines that arranged to select the chips. The controller reads a first counting control array corresponding to a first super block of the super blocks to obtain the value of a first field corresponding to a first chip of the first counting control array when data of the first super block in the first chip is required to be read, wherein the controller keeps the value of the first field and writes a second value into the other fields except of the first field of the first counting control array when the value of the first field is a first value, and writes the first value into the first field and maintain values of the other fields except for the first field of the first counting control array when the value of the first field is the second value.

Another exemplary embodiment provides a data storage device including a flash memory, a plurality of counting control arrays and a controller. The flash memory includes a plurality of chips, each of the chips has a plurality of pages, the pages of each of the chips are arranged to be assembled into a super block according to a predetermined order, and each of the super blocks includes the pages of the different chips. Each of the counting control arrays includes a plurality of fields, each of the counting control arrays corresponds to one of the super blocks, and each of the fields corresponds to one of the chips. The controller reads a first counting control array of the plurality of counting control arrays corresponding to a first chip to obtain the value of a first field corresponding to the first chip of the first counting control array when data of the first chip of a first super block is required to be read, wherein the controller keeps the value of the first field and writes a second value into the other fields except for the first field of the first counting control array when the value of the first field is a first value, and writes the first value into the first field and keeps the values of the other fields of the first counting control array when the value of the first field is the second value.

Yet another exemplary embodiment provides a data maintenance method applied to a data storage device, wherein the data storage device has a plurality of chips, each of the chips includes a plurality of pages, the pages of each of the chips are arranged to be assembled into a super block according to a predetermined order, and each of the super blocks include the pages of the different chips. The data maintenance method includes: reading a first counting control array of a plurality of counting control arrays corresponding to a first super block to obtain the value of a first field corresponding to a first chip of a plurality of fields of the first counting control array when data of the first chip corresponding to the first super block is required to be read, wherein each of the counting control arrays correspond to one of the super blocks, and each of the fields of the counting control arrays corresponds to one of the chip; keeping the value of the first field and writing a second value into the other fields except for the first field of the first counting control array when the value of the first field is a first value; and writing the first value into the first field and keeping values of the other field except for the first field of the first counting control array when the value of the first field is the second value.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
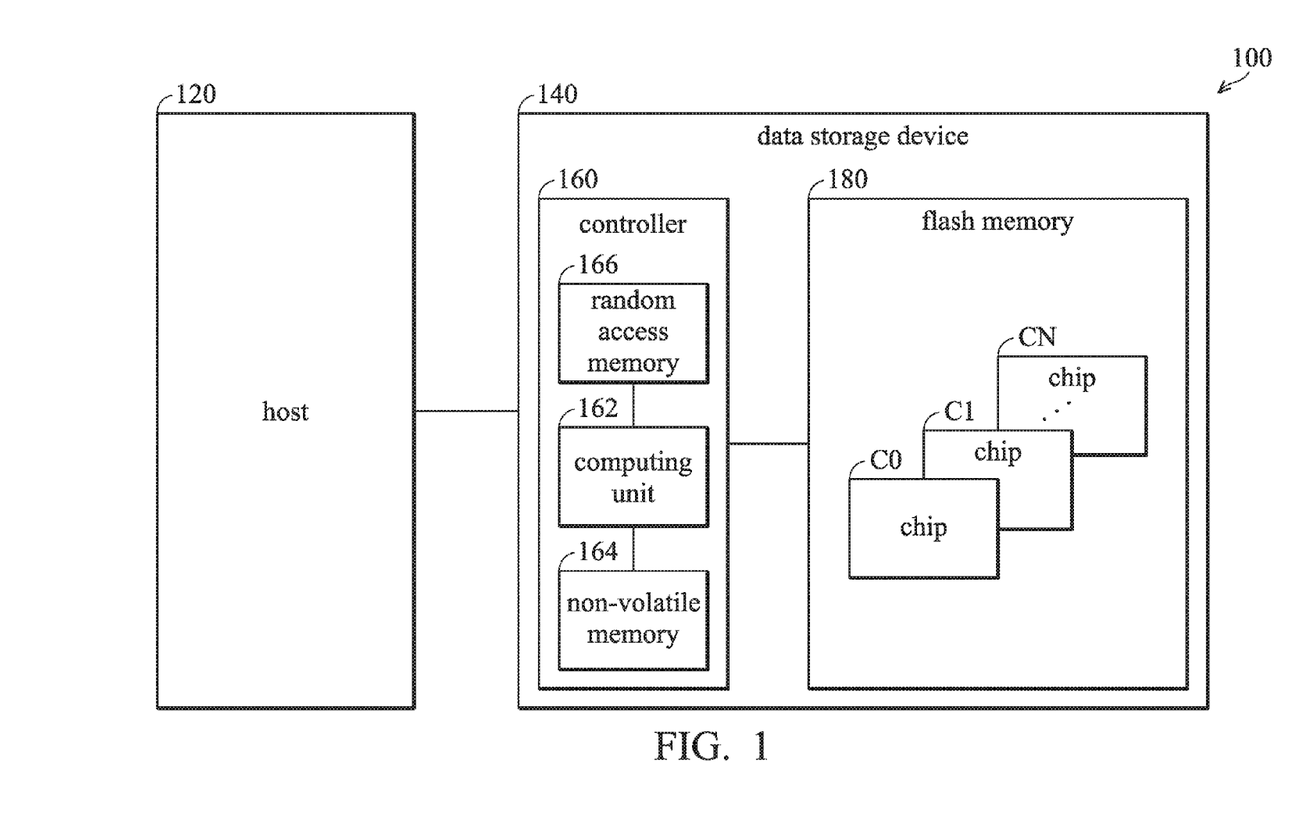
FIG. 1 is a schematic diagram illustrating an electronic system, constructed in accordance with some embodiments.

FIG. 1 is a schematic diagram illustrating an electronic system, constructed in accordance with some embodiments. The electronic system 100 includes a host 120 and a data storage device 140. The data storage device 140 includes a flash memory 180 and a controller 160, and operates in response to the commands of the host 120.

The controller 160 includes a computing unit 162, a non-volatile memory 164 (ROM) and a random access memory 166(RAM). The non-volatile memory 164, the program code stored in the non-volatile memory 164 and data stored in the non-volatile memory 164 constitute firmware executed by the processing unit 162, and the controller 160 is configured to control the flash memory 180 based on the firmware, wherein the computing unit 162 is further arranged to re-arrange the pages of the flash memory 180 to construct at least one super block.

The flash memory 180 includes a plurality of chips C0~CN, each of the chips C0~CN includes a plurality of pages. Each of the chips C0~CN includes a plurality of pages, the pages of each of the chips C0~CN are arranged to be assembled into a super block SB in a predetermined order. Namely, each of the super blocks includes the pages of the different chips C0~CN. Moreover, the flash memory 180 further includes a plurality of channel select lines and a plurality of chip select lines. The chips C0~CN are arranged in a matrix, the channel select lines are arranged to select the columns of the matrix, and the chip select lines are arranged to select the rows of the matrix. Namely, the chips C0~CN are enabled by the channel select lines and the chip select lines in matrix.

Figure 2A:
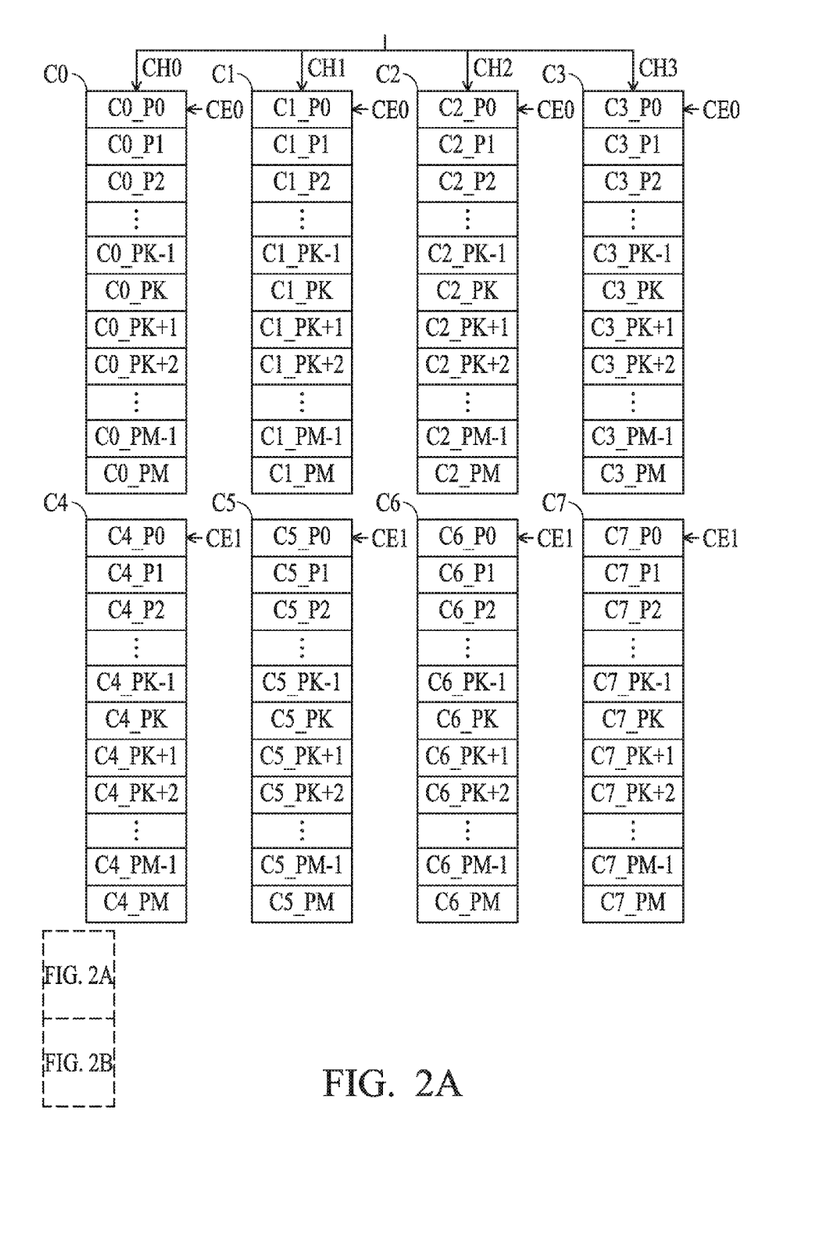
FIG. 2A-2B is a schematic diagram illustrating a flash memory, constructed in accordance with some embodiments.
Figure 2B:
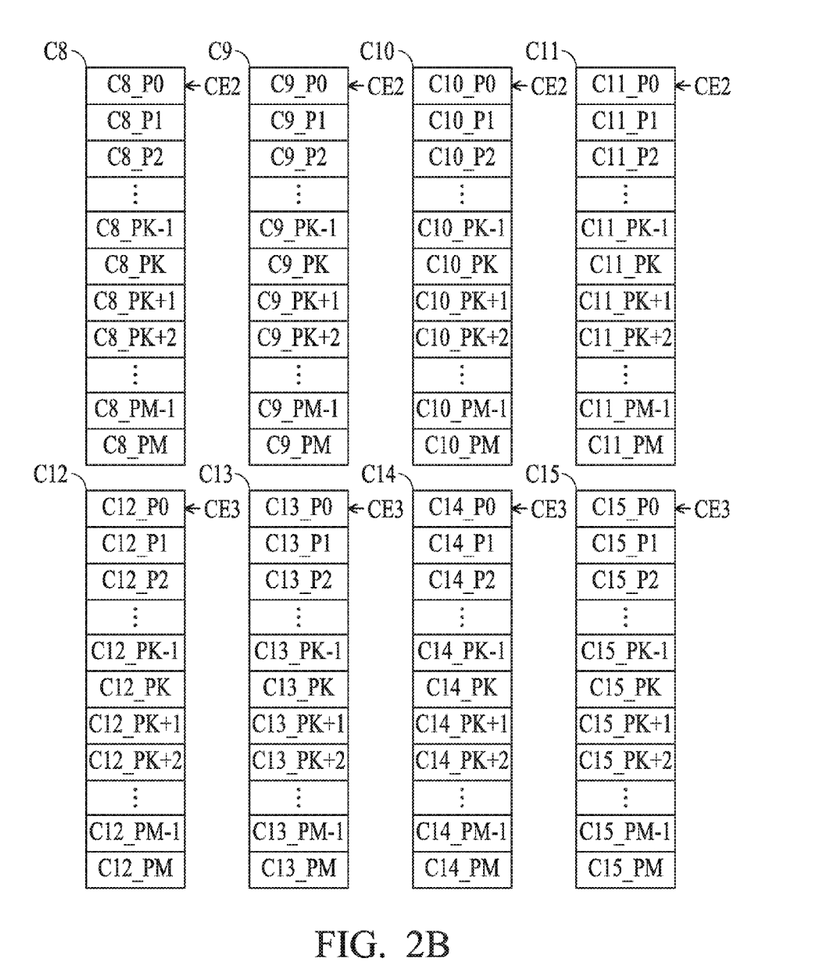

For example, FIG. 2A-2B is a schematic diagram illustrating a flash memory, constructed in accordance with some embodiments. In this embodiment, the flash memory 180 includes sixteen chips C0~C15. Each of the chips C0~C15 includes a plurality of pages, wherein the chip C0 includes a plurality of pages C0_P0~C0_PM, the chip C1 includes a plurality of pages C1_P0~C1_PM, the chip C2 includes a plurality of pages C2_P0~C2_PM, and so on. The flash memory 180 further includes four channel select lines CH0~CH3 and four chip select lines CE0~CE3. As shown in FIG. 2A~2B, the chips C0~C15 construct a matrix, the channel select lines CH0~CH3 are arranged to select the columns of the matrix, the chip select lines CE0~CE3 are arranged to select the rows of the matrix. More specifically, the channel select line CH0 is arranged to select the chips C0, C4, C8 and C12 on the first column of the matrix, the channel select line CH1 is arranged to select the chips C1, C5, C9 and C13 on the second column of the matrix, the channel select line CH2 is arranged to select the chips C2, C6, C10 and C14 on the third column of the matrix, and the channel select line CH3 is arranged to select the chips C3, C7, C11 and C15 on the forth column of the matrix. Moreover, the chip select line CE0 is arranged to select the chips C0~C3 on the first row of the matrix, the chip select line CE1 is arranged to select the chips C4~C7 on the second row of the matrix, the chip select line CE2 is arranged to select the chips C8~C11 on the third row of the matrix, and the chip select line CE3 is arranged to select the chips C12~C15 on the forth row of the matrix. Namely, when the controller 160 needs to access the chip C10, the flash memory 180 selects the chip C10 by the channel select line CH2 and the chip select line CE2, and so on. In another embodiment, the flash memory 180 may include thirty-two chips, four channel select lines and eight chip select lines, but it is not limited thereto.

Figure 3:
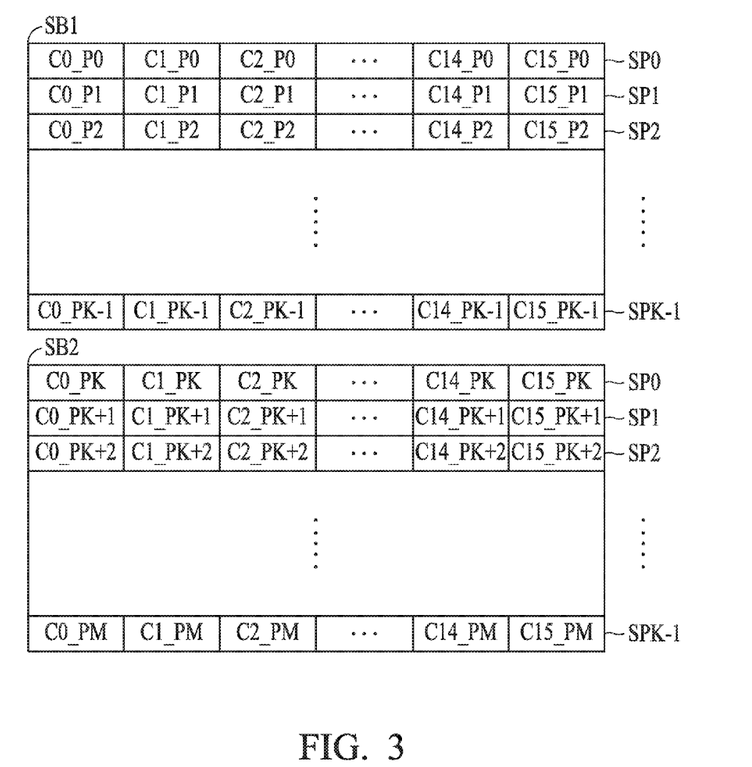
FIG. 3 is a schematic diagram illustrating a super block, constructed in accordance with some embodiments.

FIG. 3 is a schematic diagram illustrating a super block, constructed in accordance with some embodiments, wherein the super block SB1 and the super block SB2 of FIG. 3 are constructed by assembling the pages of the sixteen chips C0-C15 of the flash memory 180 of FIG. 2A~2B according to a predetermined order, but it is not limited thereto. In other embodiments, the pages of each of the sixteen chips C0-C15 can be assembled by the following rule (the predetermined order) into more than two super blocks. As shown in FIG. 3, the predetermined order is arranged to sequentially assemble the first pages P1, which are on the top of each of the chips C0-CN, into the first super page SP0 of the first super block SB1, sequentially assemble the second pages P2, which are under the first pages P1 of each of the chips C0-CN, into the second super page SP1 of the first super block SB1, and so on until the K−1th pages PK−1 of each of the chips C0-CN are assembled into the last super page SPK-1 of the first super block SB1. Next, the predetermined order arranged to continue to sequentially assemble the Kth pages PK of each of the chips C0-CN into the first super page SP0 of the second super block SB2, sequentially assemble the K+1th pages PK+1 of each of the chips C0-CN into the second super page SP1 of the second super block SB2, and so on until the last pages PM of each of the chips C0-CN into the last super page SPK-1 of the second super block SB2. In this embodiment, the number of the super pages SP0~SPK-1 of the first super block SB1 and the second super block SB2 are the same, and each of the super pages SP0~SPK-1 is constructed by a plurality of pages, but it is not limited thereto. In other embodiment, the number of the super pages of each of the super block can be different, and the first super block SB1 and the second super block SB2 can be constructed according to different order.

Moreover, the data storage device 140 further includes a plurality of counting control arrays (not shown). The counting control arrays are arranged to record the read status of the chips C0~CN. In one embodiment, the counting control arrays are implemented in the flash memory 180, but it is not limited thereto. In other embodiments, the counting control arrays are implemented in the non-volatile memory 164. Each of the counting control arrays records the read status of one of the chips C0~CN, and corresponds to a super block. Moreover, each of the counting control arrays includes a plurality of fields, each of the fields corresponds to one of the chips C0~CN. The controller 160 loads the counting control arrays into the random access memory 166 from the flash memory 180 or the non-volatile memory 164 for accessing.

Figure 4:
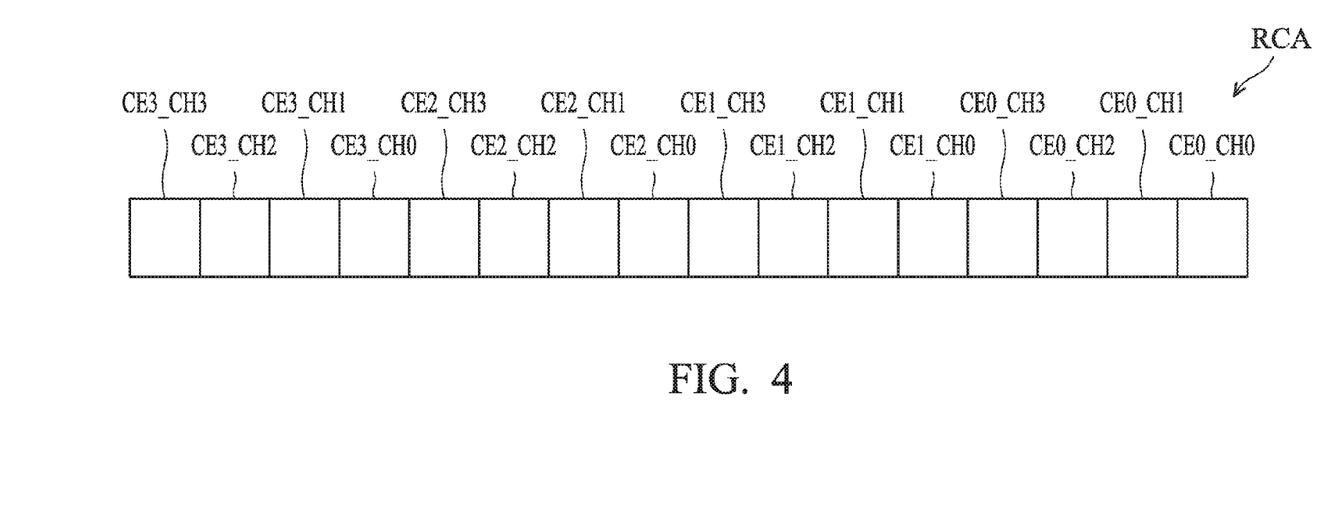
FIG. 4 is a schematic diagram illustrating a counting control array, constructed in accordance with some embodiments.

FIG. 4 is a schematic diagram illustrating a counting control array, constructed in accordance with some embodiments. In this embodiment, the counting control array RCA1 corresponds to the first super block SB1 of FIG. 3 and records the read status of the chips C0~C15, but it is not limited thereto. It should be noted that the counting control arrays of the other super blocks can also refer to the counting control array RCA1. The counting control array RCA1 includes sixteen fields, each of the fields corresponds to one of the chips C0~C15. Namely, the fields respectively correspond to a plurality of combinations CE0_CH0~CE3_CH_3 of the chip select lines CE0~CE3 and the channel select lines CH0~CH3, and each of the combinations CE0_CH0~CE3_CH_3 corresponds to one of the chips C0~C15 that can be selected by the combination.

Moreover, the data storage device 140 further includes a read count array (not shown) arranged to record the read counts of each of the super blocks. In one embodiment, the read count array is implemented in the flash memory 180, but it is not limited thereto. In other embodiments, the read count array can be also implemented in the non-volatile memory 164. The controller 160 may load the read count array into the random access memory 166 from the flash memory 180 or the non-volatile memory 164, and maintain the read counts of the read count array according to the counting control arrays.

More specifically, the data storage device 140 controls the update times of the super blocks according to the counting control arrays. In some embodiments, when any of the chip select lines or any of the channel select lines are enabled, the controller 160 increases a read count by one to calculate the number of read operations performed on the super block in order to prevent the data from damages by having too many read operations, wherein the increased read count is stored in the read count array and corresponding to the super block which is selected by the enabled chip select line and the enabled channel select lines. For example, although the super page SP0 of the first super block SB1 has only been read by one time, the read count corresponding to the super block SB1 will be increased by sixteen because of the super page SP0 is constituted by the pages controlled by the sixteen different combinations of the channel select lines and the chip select lines. When a read count corresponding to a first super block is greater than a predetermined value, the controller 160 moves the data of the first super block to another super block to update the first super block. As the read count recording method described above, the read counts are easily greater than the predetermined value. Therefore, the controller 160 will consume a lot of resources on updating super blocks. In one embodiment, the data storage device 140 can reduce the update times of the super block by using the counting control arrays.

More specifically, the controller 160 writes a first value into every field of the counting control arrays to initialize the counting control arrays. It should be noted that the controller 160 only needs to initialize the counting control array when the corresponding super block is updated or newly created, but it is not limited thereto. The user may also enable the controller 160 to initialize the counting control arrays in other situations. Next, when the data of a first chip of the chips C0~CN in a first super block is read, the controller 160 reads a first counting control array of the plurality of counting control arrays corresponding to the first super block to obtain the value of a first field of the first counting control array corresponding to the first chip. When the value of the first field is a first value, the controller 160 keeps the value of the first field of the first counting control array, and writes a second value into the other fields except for the first field of the first counting control array. When the value of the first field is the second value, the controller 160 writes the first value into the first field of the first counting control array, and keeps the values of the other fields except for the first field of the first counting control array. It should be noted that the controller 160 further increases the first read count of the read count array corresponding to the first super block by one when the value of the first field is the first value, and keeps the value of the first read count of the read count array corresponding to the first super block when the value of the first field is equal to the second value. Moreover, when any of the read count is greater than a predetermined value, the controller 160 updates the super block with the read count over the predetermined value to move the data of the super block to another super block.

Figure 5:
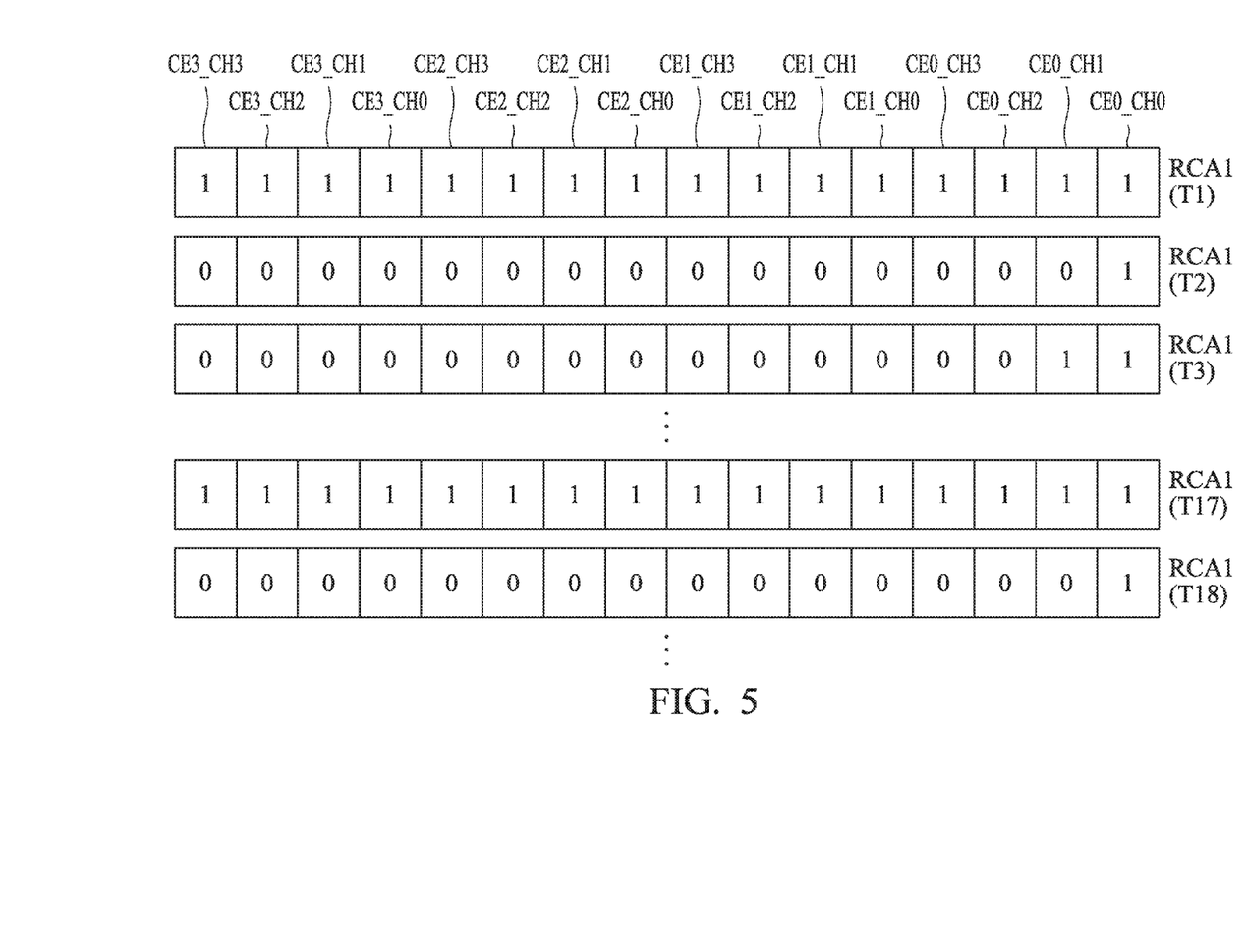
FIG. 5 is a schematic diagram illustrating another counting control array, constructed in accordance with some embodiments.

FIG. 5 is a schematic diagram illustrating another counting control array, constructed in accordance with some embodiments. In one embodiment, the counting control array RCA1 corresponds to the first super block SB1 of FIG. 3 and records the read status of the chips C0~C15, but it is not limited thereto. It should be noted that the counting control arrays of the other super blocks can also refer to the counting control array RCA1. In this embodiment, the controller 160 is configured to read the data of the super block SB sequentially. All of the values of the fields of the initialized counting control array RCA1 are the first value "1", as shown in the counting control array RCA1 on time T1.

First, the controller 160 reads the data of the page C0_P0 of the first super page SP0 of the first super block SB1. The page C0_P0 read by the controller 160 is in the chip C0 selected by the chip select line CE0 and the channel select line CH0, such that the controller 160 reads the value of the field CE0_CH0 corresponding to the chip C0. In this embodiment, as shown in the field CE0_CH0 on the first time T1, the value of the field CE0_CH0 read by the controller 160 is the first value "1". Therefore, the controller 160 keeps the value of the field CE0_CH0 and writes the second value "0" into the other fields CE0_CH1~CE3_CH3 except for the field CE0_CH0 of the counting control array RCA1, as shown in the counting control array RCA1 on the second time T2. Moreover, the value of the field CE0_CH0 read by the controller 160 is equal to the first value "1", such that the controller 160 increases the first read count of the read count array corresponding to the first super block SB1 by one.

Next, the controller 160 reads data of the page C1_P0 of the first super page SP0 of the first super block SB1. The page C1_P0 read by the controller 160 is in the chip C1 selected by the chip select line CE0 and the channel select line CH1, such that the controller 160 reads the value of the field CE0_CH1 corresponding to the chip C1. In this embodiment, as shown in the field CE0_CH1 on the second time T2, the value of the field CE0_CH1 read by the controller 160 is equal to the second value "0". Therefore, the controller 160 writes the first value "1" into the field CE0_CH1, and keeps the values of the other fields CE0_CH0 and CE0_CH2~CE3_CH3 except for the field CE0_CH1 of the counting control array RCA1, as shown in the counting control array RCA1 on the third time T3. Moreover, the value of the field CE0_CH1 read by the controller 160 is equal to the second value "0", such that the controller 160 keeps the value of the first read count of the read count array corresponding to the first super block, and so on.

When the chips C0~C15 have been read by the controller 160 sequentially, the value of the fields CE0_CH0~CE3_CH3 of the counting control array RCA1 are equal to the first "1", as shown in the counting control array RCA1 on the seventeenth time T17. It should be noted that, during the times T2~T17, the read counts are not increased. Namely, in the read operation of the first super page SP0, the first read count of the first super block SB1 is only increased by one.

The controller 160 continues to read the data of the page C0_P1 of the second super page SP1 of the first super block SB1. The page C0_P1 read by the controller 160 is in the chip C0 selected by the chip select line CE0 and the channel select line CH0, such that the controller 160 is configured to read the value of the field CE0_CH0 corresponding to the chip C0 again. In this embodiment, as shown in the field CE0_CH0 on the seventeenth time T17, the value of the field CE0_CH0 read by the controller 160 is the first value "1". Therefore, the controller 160 keeps the value of the field CE0_CH0 and writes the second value "0" into the other fields CE0_CH1~CE3_CH3 except for the field CE0_CH0 of the counting control array RCA1, as shown in the counting control array RCA1 on the eighteenth time T18. The value of the field CE0_CH0 read by the controller 160 is equal to the first value "1", such that the controller 160 increases the first read count of the read count array corresponding to the first super block SB1 by one.

As described above, the first read count of the first super block SB1 is only increased by one when the controller 160 sequentially reads the chips C0~C15. Therefore, the controller 160 can record the read count of the super block SB efficiently by using the counting control array RCA1. Moreover, in this embodiment, the first value is "1" and the second value is "0", but it is not limited thereto. In other embodiments, the first value is "0" and the second value is "1", but it is not limited thereto. Moreover, in this embodiment, each of the fields only requires one bit of memory space. Namely, the super block constituted by the sixteen chips only requires sixteen bits of memory space, the super block constituted by thirty-two chips only requires thirty-two bits of memory space, and so on.

Figure 6:
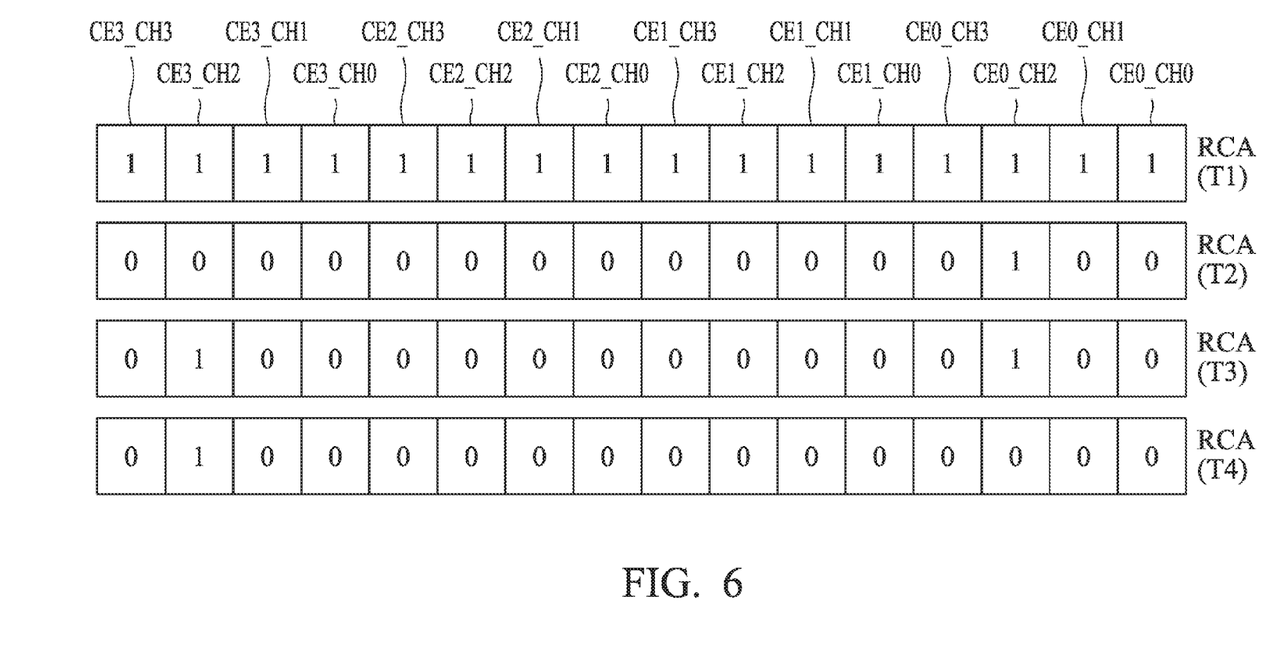
FIG. 6 is a schematic diagram illustrating another counting control array, constructed in accordance with some embodiments.

FIG. 6 is a schematic diagram illustrating another counting control array, constructed in accordance with some embodiments. In this embodiment, the counting control array RCA1 corresponds to the first super block SB1 of FIG. 3 and records the read status of the chips C0~C15, but it is not limited thereto. It should be noted that the counting control arrays of the other super blocks can also refer to the counting control array RCA1. In this embodiment, the controller 160 is configured to read the data of the super block SB randomly. All of the values of the fields of the initialized counting control array RCA1 are the first value "1", as shown in counting control array RCA1 on the first time T1.

First, the controller 160 reads the data of the page C2_P0 stored in the first super page SP0 of the first super block SB1. The page C2_P0 read by the controller 160 is in the chip C02 selected by the chip select line CE0 and the channel select line CH2, such that the controller 160 reads the value of the field CE0_CH2 corresponding to the chip C2. In this embodiment, as shown in the field CE0_CH2 on the first time T1, the value of the field CE0_CH0 read by the controller 160 is the first value "1". Therefore, the controller 160 keeps the value of the field CE0_CH2, and writes the second value "0" into the other fields CE0_CH0~CE0_CH1 and CE0_CH3~CE3_CH3 except for the field CE0_CH2 of the counting control array RCA1, as shown in the counting control array RCA1 on the second time T2. The value of the field CE0_CH0 read by the controller 160 is the first value "1", such that the controller 160 increases the first read count of the first super block SB1 of the read count array by one.

Next, the controller 160 reads the data of the page C14_P2 of the third super page SP2 of the first super block SB1. The page C14_P2 read by the controller 160 is in the chip C14 selected by the combination of the chip select line CE3 and the channel select line CH2, such that the controller 160 reads the value of the field CE3_CH2 corresponding to the chip C14. In this embodiment, as shown in the field CE3_CH2 on the second time T2, the value of the field CE3_CH2 read by the controller 160 is the second value "0". Therefore, the controller 160 writes the first value "1" into the field CE3_CH2 and keeps the values of the other fields CE0_CH0~CE3_CH1 and CE3_CH3 except for the field CE3_CH2 of the counting control array RCA1, as shown in the counting control array RCA1 on the third time T3. Moreover, the value of the field CE3_CH2 read by the controller 160 is the second value"0", such that the controller 160 keeps the value of the first read count corresponding to the first super block.

When the controller 160 is configured to randomly read the chip C14 again. For example, the controller 160 reads the data of the page C14_P1 of the second super page SP1 of the first super block SB1. The page C14_P1 read by the controller 160 is on the chip C14 selected by the combination of the chip select line CE3 and the channel select line CH2, such that the controller 160 reads the value of the field CE3_CH2 corresponding to the chip C14. In this embodiment, as shown in the field CE3_CH2 on the third time T3, the value of the field CE3_CH2 read by the controller 160 is the first value "1". Therefore, the controller 160 keeps the value of the field CE3_CH2 and writes the second value "0" into the other fields CE0_CH0~CE3_CH1 and CE3_CH3 except for the field CE3_CH2 of the counting control array RCA1, as shown in the counting control array RCA1 on the fourth time T4. Moreover, the value of the field CE3_CH2 read by the controller 160 is the first value "1", such that the controller 160 increases the first read count of the first super block SB1 by one.

As described above, the controller 160 is only configured to increase the read count by one when the same chip is read again in the random read situation, otherwise, the read count is increased by one when all of the chips C0~C15 have been read one time. Therefore, the controller 160 can decrease the invalid read count of the super block by using the counting control array RCA1. Moreover, in this embodiment, the first value is "1" and the second value is "0", but it is not limited thereto. In other embodiment, the first value is "0", and the second value is "1", but it is not limited thereto. Furthermore, in this embodiment, each of the fields only needs 1 bit of memory space.

Figure 7:
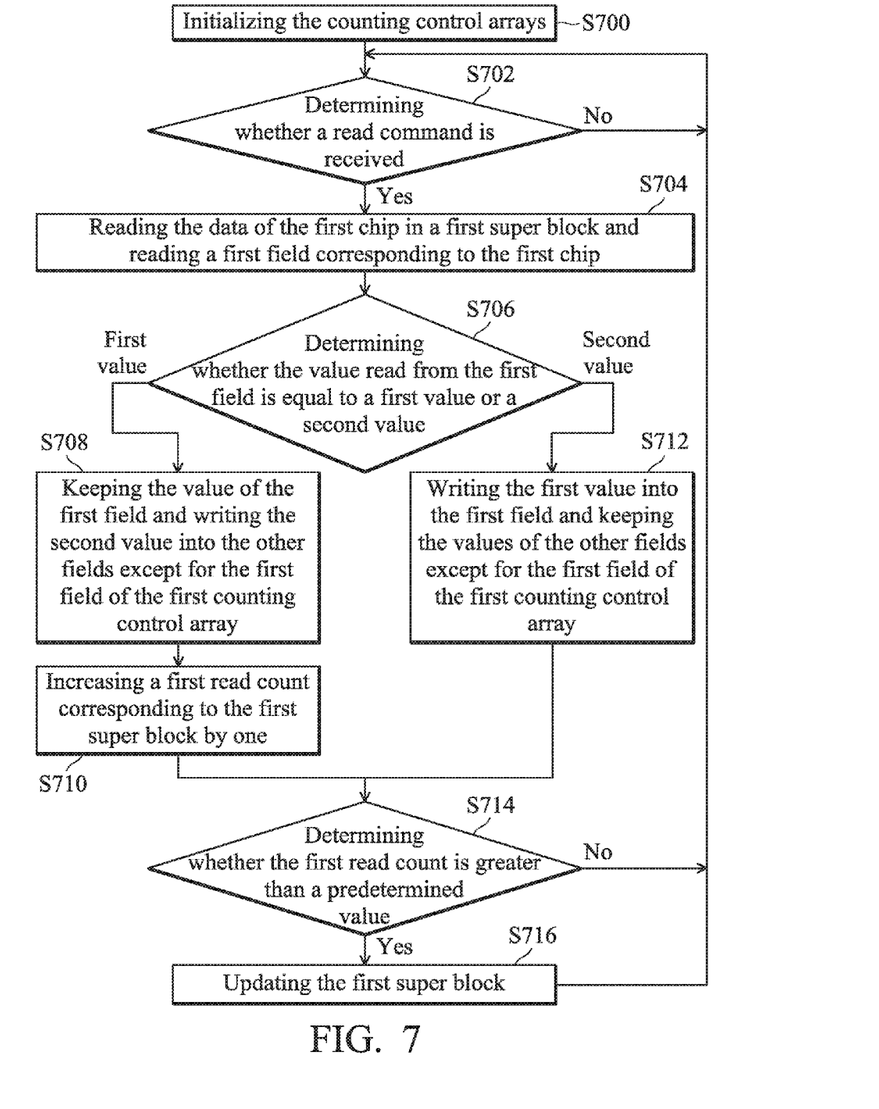
FIG. 7 is a flowchart of a data maintenance method constructed in accordance with some embodiments.

FIG. 7 is a flowchart of a data maintenance method constructed in accordance with some embodiments. The data maintenance method is applied to the data storage device 140 of FIG. 1. The data storage device 140 has a plurality of counting control arrays (not shown) and a read count array. In this embodiment, the counting control arrays and the read count array are implemented in the flash memory 180, but it is not limited thereto. In other embodiments, the counting control arrays and the read count array can be implemented in the non-volatile memory 164. The counting control arrays are arranged to record the read status of the chips C0~CN, and each of the counting control arrays corresponds to one super block. The read count array is arranged to record the read counts of the super blocks. Moreover, each of the counting control arrays includes a plurality of fields, and each of the fields corresponds to one of the chips C0~CN. The process starts at step S700.

In step S700, the controller 160 writes a first value into all fields of the counting control arrays to initialize the counting control arrays. It should be noted that the controller 160 only needs to initialize the counting control arrays when the corresponding super block is updated or newly created, but it is not limited thereto. The user may also enable the controller 160 to initialize the counting control arrays in other situations. Namely, step S700 can be skipped when the counting control array of the corresponding super block has been initialized.

Next, in step S702, the controller 160 determines whether a read command is received. When the controller 160 receives the read command, the process goes to step S703; otherwise the process goes to step S700, the controller 160 continues to determine whether a read command is received. It should be noted that the read command is only arranged to read a page. The controller 160 may produce a plurality of read commands (each of the read commands is arranged to read one page) when the received read command is arranged to read more than one pages to sequentially read the pages of the flash memory 180 according to the produced read commands, but it is not limited thereto.

In step S704, the controller 160 reads the data of the first chip of the chips chip C0~CN in a first super block, and reads a first field corresponding to the first chip, wherein the first field is in a first counting control array corresponding to the first super block.

Next, in step S706, the controller 160 determines whether the value read from the first field is equal to a first value or a second value. In one embodiment, the first value is "1" and the second value is "0", but it is not limited thereto. In other embodiments, the first value is "0" and the second value is "1", but it is not limited thereto. Moreover, in this embodiment, each of the fields only requires one bit of memory space. When the value read from the first field is the first value, the process goes to step S708. When the value read from the first field is the second value, the process goes to step S712.

In step S708, the controller 160 keeps the value of the first field and writes the second value into the other fields except for the first field of the first counting control array.

Next, in step S710, the controller 160 increases a first read count corresponding to the first super block by one, wherein the first read count is in the read count array.

In step S712, the controller 160 writes the first value into the first field and keeps the values of the other fields except for the first field of the first counting control array.

Next, in step S714, the controller 160 determines whether the first read count is greater than a predetermined value. When the first read count is greater than the predetermined value, the process goes to step S716: otherwise the process returns to step S702.

In step S716, the controller 160 updates the first super block. Next, the process returns to step S702. It should be noted that, in other embodiments, step S714 and step S716 can be performed in other specific time, it is not limited that the step S716 must to be perform while the counting control array is updated.

The data storage device 140 and the data maintenance method of the present invention may reduce the invalid read count of super block to reduce the unnecessary updates.

Data transmission methods, or certain aspects or portions thereof, may take the form of a program code (i.e., executable instructions) embodied in tangible media, such as floppy diskettes, CD-ROMs, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a flash memory, comprising a plurality of chips, a plurality of channel select lines and a plurality of chip select lines, wherein each of the chips has a plurality of pages, and the chips are arranged in a matrix, the channel select lines are arranged to select columns of the matrix, the chip select lines are arranged to select rows of the matrix, the pages of each of the chips are arranged to be assembled into a super block according to a predetermined order, and each of super blocks comprises the pages of different chips;
a plurality of counting control arrays, wherein each of the counting control arrays comprises a plurality of fields, the counting control arrays corresponds to one of the super blocks, each of the fields corresponds to one of a plurality of combinations of the chip select lines and the channel select lines that arranged to select the chips; and
a controller, reading a first counting control array corresponding to a first super block of the super blocks to obtain value of a first field corresponding to a first chip of the first counting control array when data of the first super block in the first chip is required to be read, wherein the controller keeps the value of the first field and writes a second value into other fields except of the first field of the first counting control array when the value of the first field is a first value, and writes the first value into the first field and maintain values of the other fields except for the first field of the first counting control array when the value of the first field is the second value.

2. The data storage device as claimed in claim 1, wherein the super blocks have a plurality of read counts, the controller increases a first read count of the first super block by one when the value of the first field is the first value, and keeps the value of the first read count when the value of the first field is the second value.

3. The data storage device as claimed in claim 2, further comprising a read count array arranged to record the read counts of the super blocks.

4. The data storage device as claimed in claim 2, wherein the controller updates the first super block when the first read count of the first super block is more than a predetermined value.

5. The data storage device as claimed in claim 1, wherein the controller writes the first value into the fields of the counting control arrays to initialize the counting control arrays.

6. The data storage device as claimed in claim 1, wherein the counting control arrays are implemented in the flash memory.

7. A data storage device, comprising:
a flash memory, comprising a plurality of chips, each of the chips has a plurality of pages, the pages of each of the chips are arranged to be assembled into a super block according to a predetermined order, and each of super blocks comprises the pages of different chips;
a plurality of counting control arrays, wherein each of the counting control arrays comprises a plurality of fields, each of the counting control arrays corresponds to one of the super blocks, and each of the fields corresponds to one of the chips; and
a controller, reading a first counting control array of the plurality of counting control arrays corresponding to a first chip to obtain value of a first field corresponding to the first chip of the first counting control array when data of the first chip of a first super block is required to be read, wherein the controller keeps the value of the first field and writes a second value into other fields except for the first field of the first counting control array when the value of the first field is a first value, and writes the first value into the first field and keeps the values of the other fields of the first counting control array when the value of the first field is the second value.

8. The data storage device as claimed in claim 7, wherein the flash memory further comprises a plurality of channel select lines and a plurality of chip select lines, the chips are arranged in a matrix, the channel select lines are arranged to select rows of the matrix, the chip select lines are arranged to select columns of the matrix, the fields correspond to a plurality of combinations of the chip select lines and the channel select lines, and each of the combinations corresponds to one of the chips.

9. The data storage device as claimed in claim 7, wherein the super blocks corresponds to a plurality of read counts, and the controller increases a first read count of the plurality of read counts corresponding to the first super block by one when the value of the first field is the first value, and keeps the first read count when the value of the first field is the second value.

10. The data storage device as claimed in claim 9, further comprising a read count array arranged to record the read counts of the super blocks.

11. The data storage device as claimed in claim 9, wherein when the controller further updates the first super block when the first read count of the first super block is greater than a predetermined value.

12. The data storage device as claimed in claim 7, wherein the controller further writes the first value into each of the fields of the counting control arrays to initialize the counting control arrays.

13. The data storage device as claimed in claim 7, wherein the counting control arrays are implemented in the flash memory.

14. A data maintenance method, applied to a data storage device, wherein the data storage device has a plurality of chips, each of the chips comprises a plurality of pages, the pages of each of the chips are arranged to be assembled into a super block according to a predetermined order, and each of super blocks comprise the pages of different chips, the data maintenance method comprises:
reading a first counting control array of a plurality of counting control arrays corresponding to a first super block to obtain value of a first field corresponding to a first chip of a plurality of fields of the first counting control array when data of the first chip corresponding to the first super block is required to be read, wherein each of the counting control arrays correspond to one of the super blocks, and each of the fields of the counting control arrays corresponds to one of the chip;
keeping the value of the first field and writing a second value into other fields except for the first field of the first counting control array when the value of the first field is a first value; and
writing the first value into the first field and keeping values of the other field except for the first field of the first counting control array when the value of the first field is the second value.

15. The data maintenance method as claimed in claim 14, wherein the flash memory further comprises a plurality of channel select lines and a plurality of chip select lines, the chips are arranged in a matrix, the channel select lines are arranged to select columns of the matrix, the chip select lines are arranged to select rows of the matrix, each of the fields corresponds to one of a plurality of combinations of the chip select lines and the channel select lines, each of the combinations corresponds to one of the chips.

16. The data maintenance method as claimed in claim 14, wherein the super blocks corresponds to a plurality of read counts, and the data maintenance method further comprises increasing a first read count of the first super block by one when the value of the first field is a first value, and keeping the value of the first read count when the value of the first field is the second value.

17. The data maintenance method as claimed in claim 16, further comprising updating the first super block when the first read count of the first super block is more than a predetermined value.

18. The data maintenance method as claimed in claim 15, further comprising writing the first value into each of the fields of the counting control arrays to initialize the counting control arrays.

19. The data maintenance method as claimed in claim 15, wherein the counting control arrays are implemented in the flash memory.

* * * * *